US008997111B2

(12) United States Patent
Backensto et al.

(10) Patent No.: US 8,997,111 B2
(45) Date of Patent: Mar. 31, 2015

(54) SYSTEM AND METHOD FOR DETERMINISTIC CONTEXT SWITCHING IN A REAL-TIME SCHEDULER

(75) Inventors: Keith Backensto, Oakland, CA (US); Thierry Preyssler, Las Vegas, NV (US)

(73) Assignee: Wind River Systems, Inc., Alameda, CA (US)

( * ) Notice: Subject to any disclaimer, the term of this patent is extended or adjusted under 35 U.S.C. 154(b) by 211 days.

(21) Appl. No.: 13/467,583

(22) Filed: May 9, 2012

(65) Prior Publication Data
US 2013/0305260 A1    Nov. 14, 2013

(51) Int. Cl.
*G06F 9/46* (2006.01)
*G06F 9/48* (2006.01)

(52) U.S. Cl.
CPC ........ *G06F 9/4887* (2013.01); *G06F 2209/486* (2013.01)
USPC ............ 718/108; 718/100; 718/102; 718/107

(58) Field of Classification Search
None
See application file for complete search history.

(56) References Cited

U.S. PATENT DOCUMENTS

| | | | |
|---|---|---|---|
| 5,944,840 A * | 8/1999 | Lever | 714/34 |
| 6,385,637 B1 * | 5/2002 | Peters et al. | 718/107 |
| 7,409,689 B2 * | 8/2008 | Jones et al. | 718/107 |
| 7,650,472 B2 * | 1/2010 | Lim | 711/154 |
| 2002/0198925 A1 * | 12/2002 | Smith et al. | 709/104 |
| 2006/0053423 A1 * | 3/2006 | Jones et al. | 718/100 |
| 2006/0212840 A1 * | 9/2006 | Kumamoto et al. | 717/100 |
| 2013/0117760 A1 * | 5/2013 | Cuadra et al. | 718/108 |

OTHER PUBLICATIONS

Wayback machine; http://web.archive.org/web/20120406051743/https://en.wikipedia.org/wiki/Round-robin_scheduling; Mar. 25, 2012.*

* cited by examiner

*Primary Examiner* — Emerson Puente
*Assistant Examiner* — Dong Kim
(74) *Attorney, Agent, or Firm* — Fay Kaplun & Marcin, LLP

(57) ABSTRACT

A system and method deterministically switches context in a real-time scheduler to guarantee schedule periodicity. The method includes determining a time slice for each of the plurality of processes. The method includes determining a time slice switch duration between consecutive ones of the time slices. The method includes determining a starting point for each time slice. The method includes generating a schedule as a function of the time slices, the time slice switch durations, and the starting points of the time slices. The schedule includes an order for each of the time slices for a respective one of the plurality of processes. Each of the time slices and each of the time slice switch durations are required to run for their entire duration to guarantee a periodicity of the schedule.

18 Claims, 4 Drawing Sheets

SYSTEM AND METHOD FOR DETERMINISTIC CONTEXT SWITCHING IN A REAL-TIME SCHEDULER

BACKGROUND INFORMATION

A scheduler in a computing environment allows for a plurality of processes to be run in a predetermined order and/or concurrently. The scheduler may determine a sequence at which the processes run so that each process is allowed access to a processor at a particular time. In a first use, the scheduler may allow for a single process to complete prior to any other process, such as when the scheduler includes priority data regarding the various processes to be run. In a second use, the scheduler may allow for a process to run for a predetermined amount of time at which point a further process is allowed to run for a further predetermined amount of time.

In the case where multiple processes are run for predetermined amounts of time, the scheduler includes context switch times between each context switch. That is, there is a time set aside so that the process utilizing the processor is allowed time to release the processor and the further process is allowed time to capture the processor. A conventional scheduler makes an assumption that the context switch time is negligible, in particular when compared to the predetermined time the process is allowed to capture the processor. However, this is an issue if the system must guarantee a certain amount of time to its processes or if processes may only access the processor at specific blocks of time.

The conventional scheduler also attempts to utilize all means to optimize the scheduling functionality. For example, a context switch may be optimized to save and restore the strict minimal number of the computer registers. For this reason, the context switch is regularly assumed negligible. In another example, computers have less deterministic behavior since instructions may be executed out of order, thereby causing a context switch to be non-constant in time. However, the optimization often leads to the context switch time being stolen from the process's execution time or included such that it can introduce drift in scheduling periodicity. Accordingly, with time-sharing algorithms, the scheduler would therefore not be able to accurately predict when the next time slice starts after switching contexts, thereby breaking the time slice's periodicity and forcing time slices to drift. The drift experienced from the optimization of the scheduling functionality inevitably affects the periodicity of the scheduler, with the drift accumulating over time and having a significant impact on the periodicity.

SUMMARY OF THE INVENTION

The present invention describes a device and method for deterministic context switching in a real-time scheduler to guarantee schedule periodicity. The method comprises determining a time slice for each of the plurality of processes. The method comprises determining a time slice switch duration between consecutive ones of the time slices. The method comprises determining a starting point for each time slice. The method comprises generating a schedule as a function of the time slices, the time slice switch durations, and the starting points of the time slices. The schedule includes an order for each of the time slices for a respective one of the plurality of processes. Each of the time slices and each of the time slice switch durations are required to run its entire duration to guarantee a periodicity of the schedule.

DETAILED DESCRIPTION

Figure 1:
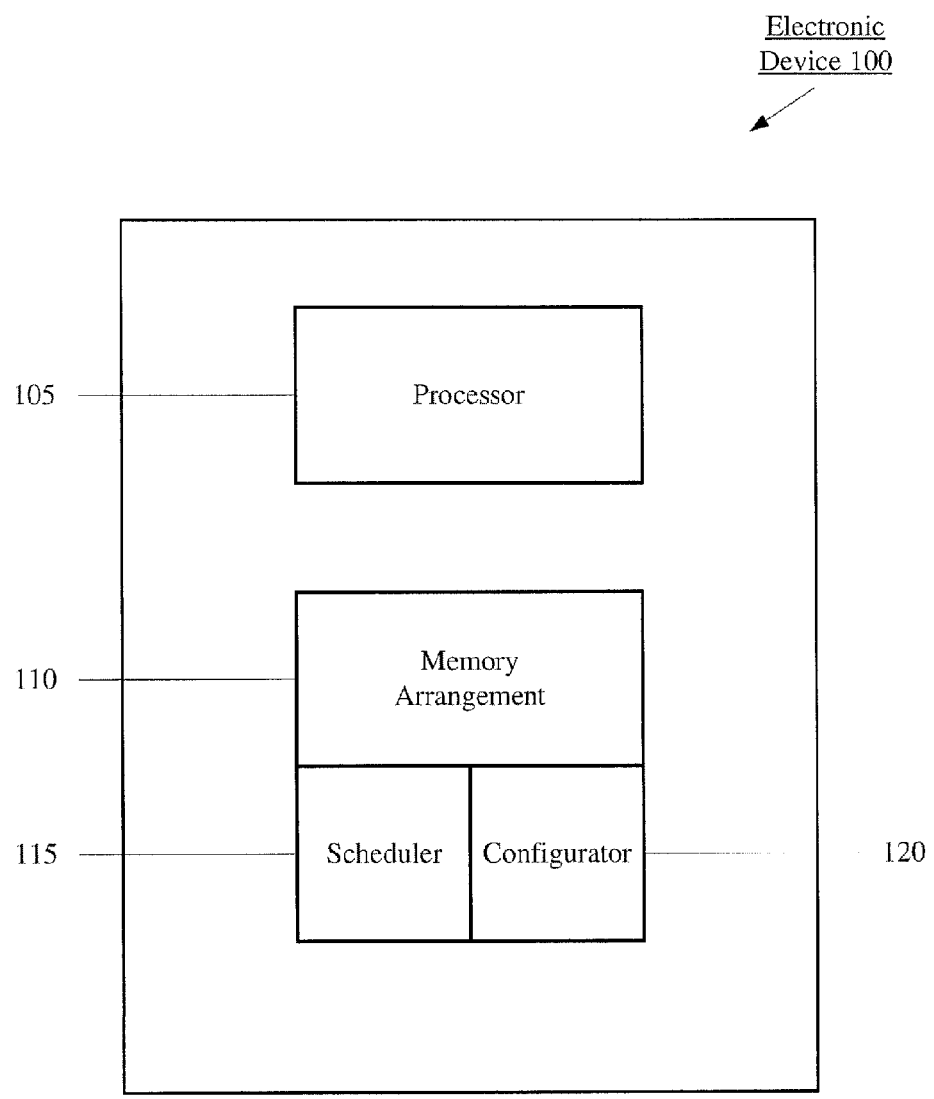
FIG. 1 shows an electronic device including a scheduler according to an exemplary embodiment of the present invention.

The exemplary embodiments may be further understood with reference to the following description of the exemplary embodiments and the related appended drawings, wherein like elements are provided with the same reference numerals. The exemplary embodiments are related to a system and method for deterministic context switching in a real-time scheduler. Specifically, the context switching is performed in a manner to guarantee a periodicity of the scheduler as well as manage latency due to hardware and software issues. Furthermore, the periodicity of the scheduler may be guaranteed from each time slice scheduling event being deterministic and calculated before the system begins. That is, the specific point at which the schedule is running may be determined at any given time regardless of the iteration number.

FIG. 1 shows an electronic device 100 including a scheduler 115 according to an exemplary embodiment of the present invention. The electronic device 100 may represent any electronic device such as a desktop computer, a laptop computer, a handheld device (e.g., cellular phone, personal digital assistant, scanner, etc.), etc. In a specific exemplary embodiment, the electronic device 100 may relate to a field of aviation in which the scheduler 115 may be an ARINC 653 scheduler. It should be noted that the electronic device 100 may include conventional components such as a memory arrangement 110, a transceiver, an input/output device, a display, etc.

The exemplary embodiments of the present invention may be applied to the processor 105 utilizing the scheduler 115. The scheduler 115 may be any component of the electronic device 100 configured to determine access for a thread, process, or data flow to a resource such as the processor 105. Specifically, the scheduler 115 may be embodied as a separate hardware component configured to perform its functionality or, as illustrated, may be a software component executed by the processor 105 to perform its functionality. The scheduling of the processes may be performed using a variety of ways. According to the exemplary embodiments of the present invention, the scheduler 115 may utilize a multiple independent levels of security/safety (MILS) architecture. As such, the MILS architecture may include a MILS kernel.

The MILS kernel may be a type 1 hypervisor that provides hard real-time time-partitioned scheduling. The hypervisor may be a hardware virtualization technique allowing multiple operating systems (i.e., guests) to run concurrently on a host computer. The hypervisor may also apply to multiple core or multi-core processors in which processes running on a core are considered a guest. As a system that is conceptually one level higher than a conventional supervisory program, the hypervisor presents to the guest operating systems a virtual operating platform and manages the execution of the guest operating systems. Multiple instances of a variety of operating systems may share the virtualized hardware resources. As a type 1 hypervisor, the MILS kernel may run directly on the hardware of the host computer to control the hardware and to manage the guest operating systems. The guest operating systems thus run on another level above the hypervisor.

According to the exemplary embodiments of the present invention, the MILS kernel scheduler may be a two level hard real-time time-partitioning scheduler. The first level may be configured to schedule time slices and the second level may be configured to schedule the guest operating systems to be executed within a time slice. The time slice may be a portion of time that has a pre-defined duration with a start and an end. A configurator 120 of the electronic device 100 may specify the duration for each time slice at configuration time. It should be noted that the configurator 120 may represent any form that specifies the durations. In a first example, the configurator 120 may be represented as a software component such as configuration file or program that generates a configuration statically. In a second example, the configurator 120 may be represented as a component of the electronic device 100 configured with the functionality described above. It should be noted that a duration may be configured in any unit of time (e.g., nanoseconds, clock ticks, etc.). When a time slice is scheduled for execution, it may be scheduled for its full duration with no other time slice having access to a resource such as the processor. The duration of one time slice is independent of the duration of all other time slices. Time slices are scheduled in the order specified by the schedule. Once every time slice in the schedule has been executed, the scheduler 115 restarts the beginning of the schedule. The time slice execution order cannot be changed at runtime.

It should be noted that the use of the MILS kernel as the scheduler 115 is only exemplary. The exemplary embodiments of the present invention may be applied to any scheduler in which more than one process is configured to run. For example, the scheduler 115 of the present invention may be utilized for different types of schedulers such as long-term, medium-term, or short-term as well as different types of scheduling disciplines such as fixed priority, round-robin, etc.

It should also be noted that the representation of the scheduler 115 and the configurator 120 as software components is only exemplary. According to the illustrated exemplary embodiment, the scheduler 115 and the configurator 120 may be software components with the above-described functionalities stored on the memory arrangement 110 for the processor 105 to execute. However, those skilled in the art will understand that the scheduler 115, the configurator 120, or both components may be separate hardware components configured to perform its respective functionality.

According to the exemplary embodiments of the present invention, each time slice defines a switch duration which is specified by the configurator 120 at configuration time. The time slice switch duration accounts for a time to perform a context switch from a first time slice duration to a second time slice duration. The time slice switch duration also accounts for a maximum latency in the system. As discussed above, latency may occur between time slices and the exemplary embodiments of the present invention are configured to ensure the periodicity of the scheduler 115.

Furthermore, to guarantee the periodicity of the scheduler 115, the entire time allocated to perform the time slice switch is used. That is, even when the time slice switch requires less time than what is allocated, the scheduler 115 utilizes the entire time slice switch duration. Specifically, if the switch is completed in less time, the scheduler 115 waits until the full time is consumed before releasing the next context for execution. On the other hand, if the time slice switch takes longer than the configured duration (i.e., requires more time than the allocated time slice switch duration), the scheduler 115 considers it as a fault. When the fault occurs, a fault manager is configured to handle the fault as will be discussed in further detail below. In a substantially similar manner as the scheduler 115 and the configurator 120, the fault manager may be a separate hardware component configured to perform its functionality or a software component executed by the processor 105 to perform its functionality.

The scheduler 115 utilizes two time lines: a time line measured by a high-resolution timer and a time line computed by the scheduler 115. The high-resolution timer gives a physical time representation. That is, the high-resolution timer relates to the time as the time slices and time slice switch durations are occurring. It should be noted that the high-resolution timer may be a part of the scheduler 115 or may be a separate component of the electronic device 100. The computed time line gives a perfect time representation. That is, the computed time line provides the time in an ideal scenario in which the processes occur within the allotted time slices as well as the time slice switch occurring within the allotted time slice switch durations. The two time lines allow the scheduler 115 to start and stop each time slice on time, to detect latencies in hardware and/or software, and to ensure the time slice periodicity.

The high-resolution timer provides a further role. As discussed above, the first role of the high-resolution timer is to measure time. The second role of the high-resolution timer is to generate a physical interrupt when a precise moment in time is reached. Accordingly, the high-resolution timer measures the physical time by small increments. A register provides the number of increments that have occurred since the start of the high-resolution timer. To ensure the periodicity, the register is never modified, thereby the system having no impact on the physical time measurement. The smaller the time increment also enables more precision of the timing between context switches. Since the scheduler 115 may rely entirely on the high-resolution timer to measure time, the precision of the scheduler 115 depends thereupon. Furthermore, the scheduler 115 may not compensate for any deficiencies that a particular timer may have.

The high-resolution timer may be programmed by the scheduler 115 to generate a hardware interrupt when a specific value of the high-resolution timer register is reached. The interrupt may inform the scheduler 115 that a specific action should occur at that moment in time. As will be discussed below in particular with reference to FIG. 2, the specific actions may relate to releasing and acquiring a resource such as the processor 105.

The computed time lines may be computed by the scheduler 115 using information provided by the configurator 120. During initialization, the scheduler 115 may compute several parameters. A first parameter may be a number of high-resolution timer increments that represent the start time of the first "major frame," where the "major frame" is defined as the sum of all time slices in a schedule, including each time slice switch duration. By default, the first major frame may start as soon as the scheduler finishes initializing the system. However, it should be noted that the scheduler may provide an extension to allow a specific start time to be set. A second parameter may be a number of high-resolution timer increments that represent a time slice duration. Thus, an allocated time for the time slice may be predetermined. A third parameter may be a number of high-resolution timer increments that represent a starting point of each time slice from the beginning of the major frame. Thus, a predetermined time at which each time slice is to start may be predetermined. A fourth parameter may be a number of high-resolution timer increments that represent each time slice switch duration. Thus, an allocated time for the time slice switch duration may be predetermined.

The scheduler 115 may use the above described parameter values and the value of the high-resolution timer at the start of the major frame to compute the value of the high-resolution timer at specified times. In a first example, the scheduler 115 may compute the value of the high-resolution timer at the start of a time slice by adding a number of high-resolution timer increments that represent the time slice switch duration to the previous time slice calculated stop time. In a second example, the scheduler 115 may compute the value of the high-resolution timer at the end of a time slice by adding a number of high-resolution timer increments that represent the time slice duration to the time slice start time. Accordingly, the periodicity may be guaranteed since there is no drift experienced. The scheduler 115 will always be aware of when the time slices are to occur as well as the context switches, thereby knowing when each procedure of the schedule occurs at any given time. The periodicity of the scheduler 115 will be explained in further detail below with regard to a specific example.

Figure 2:
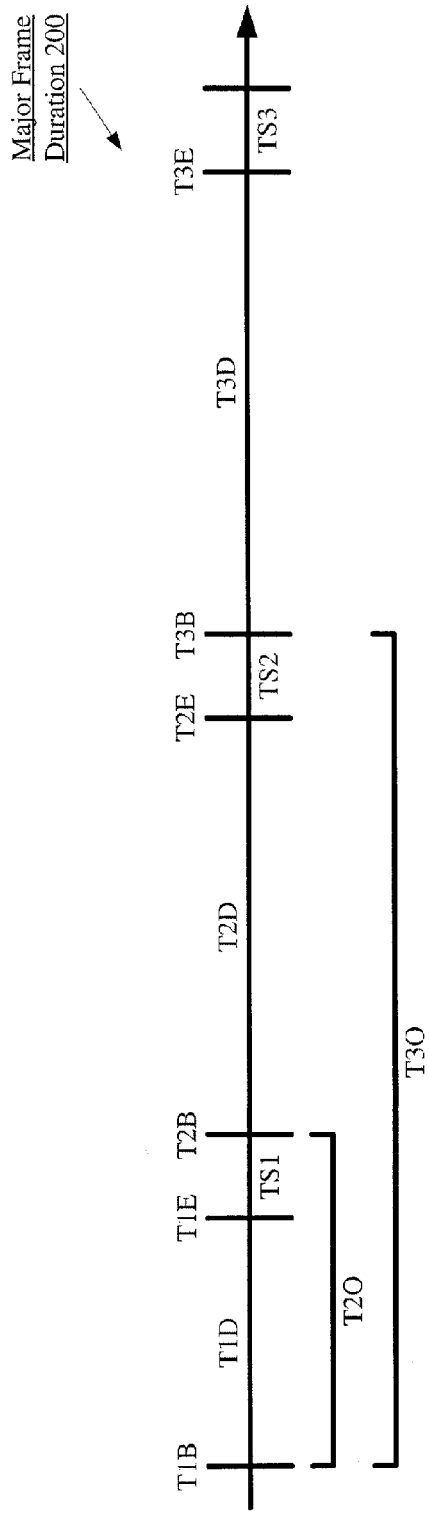
FIG. 2 shows a major frame of a schedule according to an exemplary embodiment of the present invention.

FIG. 2 shows a major frame 200 of the scheduler 115 according to an exemplary embodiment of the present invention. As discussed above, one or more time slices may be grouped together into a schedule that are defined by the configurator 120 at configuration time. Also as discussed above, the sum of all the time slices may be the major frame 200. Thus, the major frame 200 may be a single run of each time slice included therein until the major frame 200 is repeated at a subsequent time (e.g., upon the major frame duration lapsing). As illustrated, the major frame duration 200 may include three distinct time slices.

It should be noted that the use of three time slices is only exemplary. The major frame duration 200 may include any number of time slices and accordingly, time slice switch durations between each time slice. To simplify how the scheduler 115 operates to guarantee the periodicity of the schedule, the major frame duration 200 is described herein with three time slices.

As discussed above, during a context switch, the MILS kernel scheduler saves and restores all registers that a context (e.g., a process of a time slice) is configured to access. Consequently, the context switch duration is not negligible and must be taken into account. Otherwise, the time to perform a context switch is stolen from the context's execution time and the scheduler 115 is incapable of guaranteeing a time slice's duration. That is, the time allocated for executing the next process may be cut short to accommodate the context switch. Accordingly, the exemplary embodiments of the present invention provide a means of guaranteeing the periodicity of the major frame duration 200.

The major frame 200 may include three time slices with durations, T1D, T2D, and T3D. Each time slice has a beginning point and an end point. Thus, the time slice T1D has a beginning at T1B and an end at T1E; the time slice T2D has a beginning at T2B and an end at T2B; the time slice T3D has a beginning at T3B and an end at T3E. Between each time slice, specifically from an end of a time slice and a beginning of a subsequent time slice, a time slice switch duration is included. Thus, from T1E to T2B, the time slice switch duration TS1 is included; from T2E to T3B, the time slice switch duration TS2 is included; and after T3E, the time slice switch duration TS3 is included. FIG. 2 further illustrates an offset time in which the second time slice begins as T20 with the offset time in which the third time slice begins as T30.

As discussed above, a first aspect of the exemplary embodiments of the present invention is the major frame 200 is generated by the scheduler 115 and the configurator 120. Specifically, the timer increments for each of the time slices T1D, T2D, and T3D as well as the time slice switch durations TS1, TS2, and TS3 are determined. Furthermore, the starting times T1B, T2B, and T3B are determined. Using the timer increments and the starting times, the scheduler 115 and the configurator 120 are able to generate the major frame 200.

It should be noted that according to the exemplary embodiment described above in which three time slices are used, the three time slices represent a total number of processes that are run concurrently on the processor 105. However, as discussed above that the use of three time slices being exemplary, if the major frame 200 included four time slices, this may represent four processes run concurrently; five time slices represent five processes run concurrently; etc. It should also be noted that a particular process may run in multiple time slices within a given major frame. For example, if the process is of a high priority and requires more time than other processes, the major frame 200 may be generated so that the high priority process is able to run more than once in a given major frame.

A second aspect of the exemplary embodiments of the present invention is upon starting the schedule including the major frame 200. That is, the processes are concurrently run according to the schedule set forth by the scheduler 115 and the configurator 120. As discussed above, the schedule is ensured to maintain periodicity. Thus, when the major frame 200 is begun at T1B, a first process to be run during the time slice T1D starts. Accordingly, the first process is assigned the resource (e.g., the processor 105). When the entirety of the time slice T1D lapses at the end point T1E, the major frame 200 indicates (e.g., via an interrupt) that the time slice switch duration TS1 is to start. At this point, the resource is unassigned from the first process. When the entirety of the time slice switch duration TS1 lapses at the beginning point T2B, the major frame 200 indicates that the time slice T2D starts. At this point, the resource is assigned to the second process. This process repeats with the time slice switch duration TS2, the time slice T3D, and the time slice switch duration TS3 until the entirety of the major frame 200 is completed.

It should be noted that during the context switch (e.g., time slice switch duration TS1), the scheduler 115 may be configured to perform further functionalities. In a first example, the scheduler 115 may save the first process's context (processor 105 is unassigned). In a second example, the scheduler 115 may load the second process's context. Upon the saving and the loading and according to the exemplary embodiments of the present invention, the scheduler 115 may not complete the context switch until the end of the time slice switch duration, at which point the second process is assigned the resource.

Upon completion of the major frame 200, the major frame 200 repeats from the first beginning time T1B. Those skilled in the art will understand that each iteration of the major frame 200 results in the time slice durations and the time slice switch durations to be run at a known time since each of the time slice durations and the time slice switch durations are run to completion for the entirety thereof. Therefore, if the major frame 200 requires 21 ms, the first time slice T1D may be set at 5 ms, the second time slice T2D may be set at 6 ms, and the third time slice T3D may be set at 7 ms while each of the time slice switch durations TS1, TS2, and TS3 may be set at 1 ms. With a guaranteed periodicity, a point at which the major frame 200 is being run at a given time may be determined. For example, if the point of the major frame 200 is to be determined at 32 seconds (i.e., 3200 ms) after starting the schedule at a time of 0 ms, it may be known that the point is 2 ms into the second time slice duration T2D.

It should be noted that each of the time slice switch durations TS1, TS2, and TS3 being equal in the number of time increments is only exemplary. In another exemplary embodiment of the present invention, the time slice switch durations TS1, TS2, and TS3 may have equal or non-equal values in which one of the time slice durations may be greater than a further one of the time slice durations. Furthermore, it should be noted that the time slice durations T1D, T2D, and T3D being of different numbers of time increments is only exemplary. In another exemplary embodiment of the present invention, each of the time slice durations T1D, T2D, and T3D may be of equal number of time increments.

It should be noted that the third time slice TS3 may be included at the end of the major frame duration 200 in preparation for a repetition of the major frame duration 200. Thus, the TS3 may be used to release the resource from the process running in the third time slice and the process running in the first time slice may acquire the resource since the process of the first time slice follows the process of the third time slice.

Figure 3:
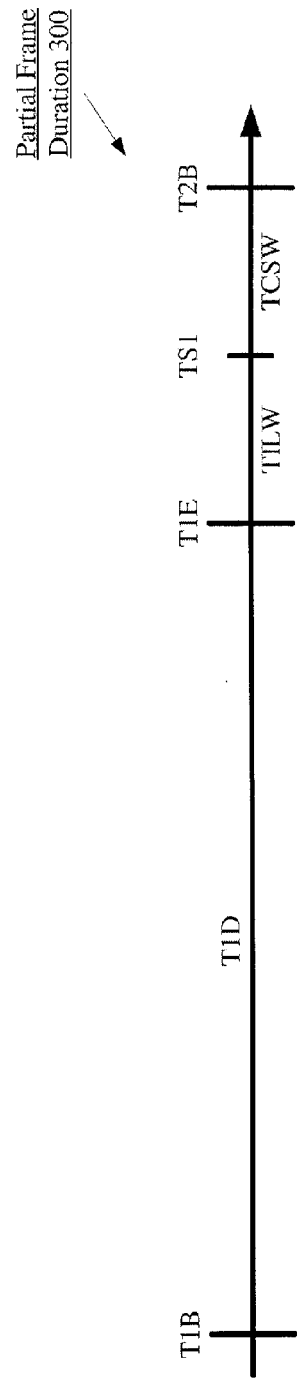
FIG. 3 shows a partial frame of a schedule according to an exemplary embodiment of the present invention.

As discussed above, the exemplary embodiments of the present invention are also configured to manage latencies. Specifically, the latencies are managed during the time slice switch durations TS1, TS2, and TS3. FIG. 3 shows a partial frame 300 of the major frame 200 according to an exemplary embodiment of the present invention. Specifically, the partial frame 300 shows the first time slice T1D and the first time slice switch duration TS1. The scheduler 115 and the configurator 120 may also generate a time latency worst case point TILW and a time context switch worst case point TCSW within the time slice switch duration TS1.

If a process executed during the first time slice T1D uses more time than allotted, latency may be the cause. Therefore, the time slice switch TS1 is configured to allow latency to be compensated in the allotted time therein. Specifically, the TILW allows for a specified time in which the latency may be compensated. If the latency may be compensated within the TILW of the TS1, the schedule may continue as generated. The release of the resource must therefore be completed within the TCSW so that the following process may acquire the resource at the end of the TCSW. As a worst case point within the duration, should the latency require more time than the TILW, the fault manager may determine subsequent actions to be taken.

The fault manager may be configured by the user so that specific actions may be taken should the fault manager be required. In a first example, the fault manager may ignore the fault, allowing the process to steal time from the subsequent process's time slice. In a second example, the fault manager may halt or reboot the processor because stealing time from other processes is, for example, forbidden.

It should be noted that the TILW and the TCSW may also be determined as timer increments by the scheduler 115 and the configurator 120. Therefore, the generation of the schedule may include these points. The number of timer increments of the TILW and the TCSW may be set by the user so allow for the release and acquisition of the resource as well as resolve any latency issues that may arise.

Figure 4:
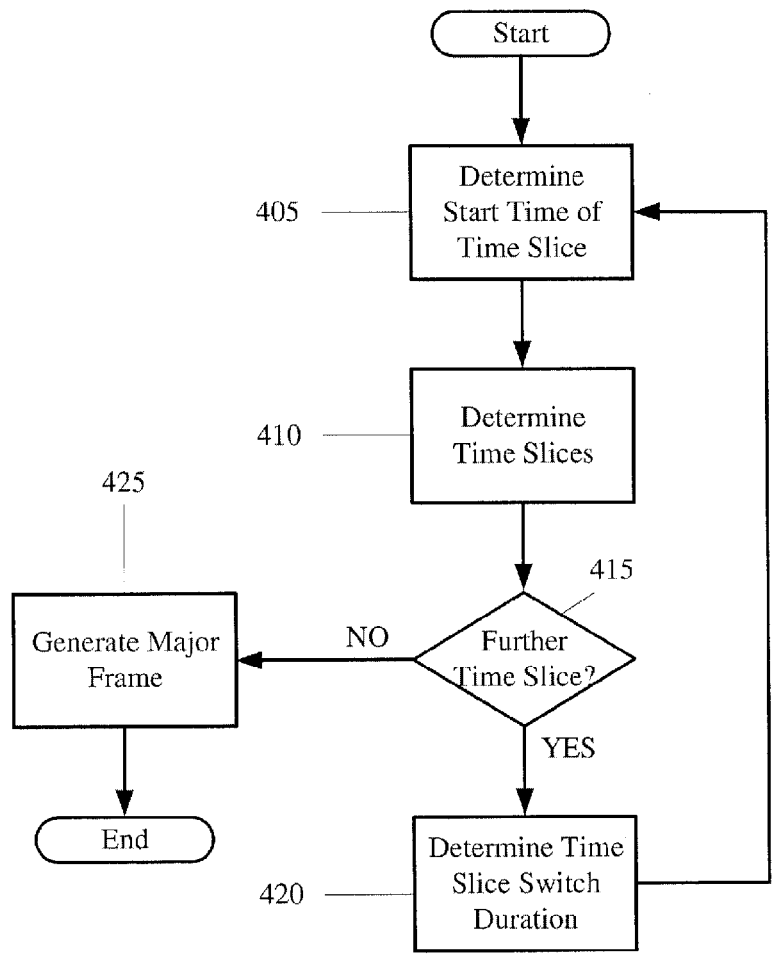
FIG. 4 shows a method for generating a major frame of a schedule according to an exemplary embodiment of the present invention.

FIG. 4 shows a method 400 for generating the major frame 200 of a schedule according to an exemplary embodiment of the present invention. As discussed above, the exemplary embodiments of the present invention may include a first aspect in which the schedule is generated in a deterministic manner prior to the processes being executed. Also as discussed above, the schedule may include a major frame 200 that indicates how the schedule is run and repeated.

In step 405, the scheduler 115 and the configurator 120 determine a start time of the first time slice. Specifically, the start time as illustrated in FIG. 2 may be T1B. As discussed above, the start time may be a default setting in which the major frame beings upon the scheduler 115 completing the initialization of the system or may be configured explicitly by the administrator.

In step 410, the time slice is determined. Specifically, the first time slice duration T1D is determined by the number of high-resolution timer increments that would fully occupy the configured time slice duration. In step 415, a determination is made whether a further time slice is present. As illustrated, after the first time slice T1D, a second time slice T2D is present. Thus, the method 400 continues to step 420.

In step 420, the time slice switch duration is determined. Specifically, the time slice switch duration TS1 is determined by the number of high-resolution timer increments that would fully occupy the configured time slice switch duration. The method 400 returns to step 405 in which the start time of the further time slice is determined. This may be performed simply by adding the time increments of the first time slice duration T1D and the first time slice switch duration TS1. By repeating the method 400, when step 410 is repeated, the second time slice duration T2D may be determined.

Returning to step 415, when no further time slices are present, the method 400 continues to step 425 in which the major frame 100 is generated with the beginning time of the time slices, the end time of the time slices, the temporal length of the time slices and time slice switch durations.

Figure 5:
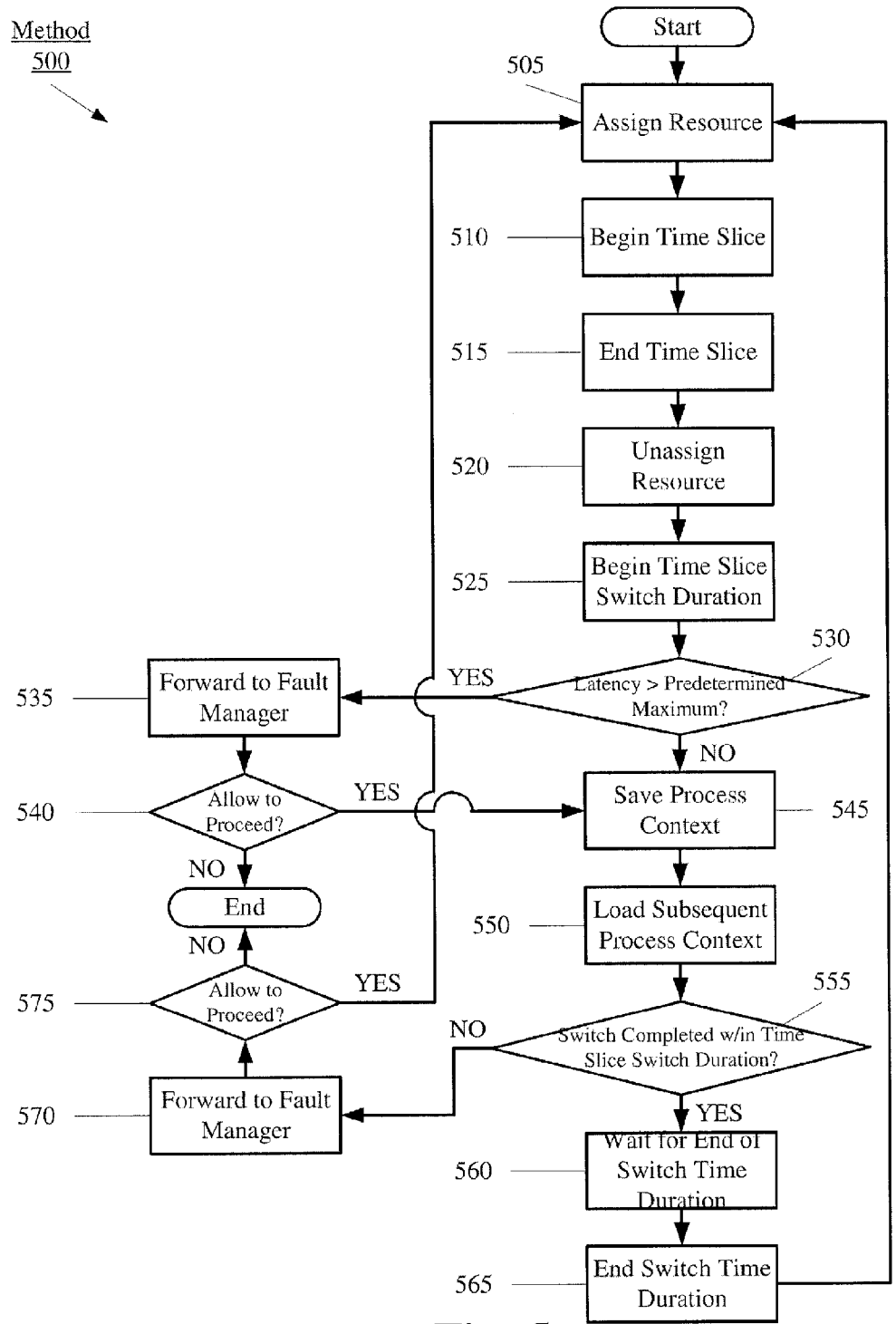
FIG. 5 shows a method for context switching according to an exemplary embodiment of the present invention.

FIG. 5 shows a method 500 for context switching according to an exemplary embodiment of the present invention. As discussed above, the exemplary embodiments of the present invention may include a second aspect in which the schedule is being executed in the deterministic manner. That is, the schedule including the major frame 200 is run and repeated with the processes designated by the time slices being executed at the predetermined times.

In step 505, the process to run during the first time slice T1D is assigned the resource, such as the processor 105. In step 510, the major frame 200 therefore begins with the first time slice at T1B. In step 515, upon reaching the first end point T1E, the first time slice T1D may end. Accordingly, in step 520, the resource may be unassigned. Subsequently, in step 525, the first time slice switch TS1 may begin.

In step 530, a determination may be made as to whether latency exists, and if it is greater than a predetermined, configured maximum. For example, the predetermined, configured maximum may be the TILW for a time slice. If the latency is determined to be greater than the predetermined maximum, the method 500 continues to step 535. In step 535, a determination is made whether the process is allowed to proceed. As discussed above, the fault manager handles the fault in a manner specified by the user such as ignoring the fault or resetting/halting the processor. If the fault manager allows the process to proceed, the method 500 continues to step 545 which will be discussed below. If the fault manager does not allow the process to proceed, the method 500 ends.

Returning to step 530, if the latency is less than the predetermined maximum, the method 500 continues to step 545. In step 545, the process context is saved. As discussed above, as the process is run, when an interrupt ceasing the processing thereof, the process context may be saved so that when the process is subsequently run at a further time, a continuation of the process may commence where it left off. In step 550, the subsequent process context (e.g., the process to be run during T2D) is loaded to the greatest extent possible without actually assigning the resource (e.g., the processor 105) to the process.

In step 555, a determination is made whether the switch has been completed within the designated time slice switch duration. If the switch has not completed in this duration, the method 500 continues to step 570 where the fault manager handles the fault in a further predetermined manner. Thus, in step 575, a determination is made whether the process is allowed to proceed. If the fault manager allows the process to proceed, the method 500 returns to step 505. If the fault manager does not allow the process to proceed, the method 500 ends.

Returning to step 555, if the switch was successfully completed, the method 500 continues to step 560. In step 560, the entirety of the time slice switch duration is consumed. That is, the scheduler 115 waits for the end of the time slice switch duration. In step 565, the time slice switch duration ends. At the end of the time slice switch duration, the subsequent process may be assigned the resource for processing thereof. Accordingly, the method 500 returns to step 505.

The exemplary embodiments of the present invention allow for a schedule to be generated in a deterministic manner prior to a system starting to allow for a hard real-time time partitioned scheduling in which a periodicity is guaranteed. In a first aspect of the present invention, the schedule may be generated through a determination of time increments designated for each time slice, a determination of a start time of a major frame, and a determination of time increments designated for each time slice switch. In a second aspect of the present invention, the system may be run according to the predetermined schedule and each time slice duration and time slice switch duration may be fully executed in the allotted time. In this manner, the periodicity may be maintained regardless of a number of iterations of the major frame. The exemplary embodiments of the present invention may further manage latencies during the time slice switch durations to maintain the periodicity in which a fault manager may be used should the periodicity be adversely affected.

Those skilled in the art will understand that the above-described exemplary embodiments may be implemented in any number of manners, including, as a separate software module, as a combination of hardware and software, etc. For example, the scheduler and the configurator may be programs containing lines of code that, when compiled, may be executed on the processor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalents.

What is claimed is:

1. An electronic device, comprising:
a processor configured to execute a plurality of processes;
a memory device storing a configurator and a scheduler;
wherein the configurator executed by the processor is configured to determine a time slice for each of the plurality of processes and a time slice switch between consecutive ones of the time slices, the configurator further determining a starting point for each time slice,
wherein the scheduler executed by the processor is configured to generate a schedule including the time slices as a function of durations of each of the time slices, durations of each of the time slice switches, and the starting points of the time slices, the schedule including an order for each of the time slices for a respective one of the plurality of processes, and
wherein, when performance of one of the time slice switches requires less time than the duration of the one of the time slice switches, the scheduler waits until the end of the duration before completing a context switch in order to guarantee a periodicity of the schedule; and
wherein the duration of each of the time slice switches is determined in response to generating a worst case time latency and a time context switch worst case for one of the plurality of processes being executed during the respective time slice.

2. The device of claim 1, wherein the schedule includes a major frame including each of the time slices and the time slice switch durations.

3. The device of claim 2, wherein the major frame duration repeats upon completion thereof.

4. The device of claim 2, further comprising:
a timer providing a physical time representation and generating a physical interrupt when a predetermined moment within the major frame is reached.

5. The device of claim 4, wherein the physical interrupt occurs at an end of one of the time slices.

6. The device of claim 4, wherein each of the time slice durations and each of the time slice switch durations includes a respective, predetermined number of time increments.

7. The device of claim 1, wherein the configurator further determines a start time of a first run of the schedule.

8. The device of claim 1, further comprising:
a fault manager executed by the processor is configured to determine a predetermined action when one of the latencies run beyond a preset point within the time slice switch duration.

9. The device of claim 8, wherein the predetermined action is one of halting the processor, resetting the processor, or ignoring the latency to allow the schedule to continue.

10. A method, comprising:
determining a time slice for each of a plurality of processes;
determining a duration of time slice switches between consecutive ones of the time slices;
determining a starting point for each time slice;
generating a schedule including the time slices as a function of durations of each of the time slices, durations of each of the time slice switches, and the starting points of the time slices, the schedule including an order for each of the time slices for a respective one of the plurality of processes,
wherein, when performance of one of the time slice switches requires less time than the duration of the one of the time slice switches, a scheduler waits until the end of the duration before completing a context switch in order to guarantee a periodicity of the schedule; and
wherein the duration of each of the time slice switches is determined in response to generating a worst case time latency and a time context switch worst case for one of the plurality of processes being executed during the respective time slice.

11. The method of claim 10, wherein the schedule includes a major frame duration including each of the time slices and the time slice switch durations.

12. The method of claim 11, further comprising:
providing a physical time representation; and
generating a physical interrupt when a predetermined moment within the major frame is reached.

13. The method of claim 12, wherein the physical interrupt occurs at an end of one of the time slices.

14. The method of claim 12, wherein, each of the time slices and the time slice switch durations include a respective, predetermined number of time increments.

15. The method of claim 10, further comprising:
determining a start time of a first run of the schedule.

16. The method of claim 10, further comprising:
determining a predetermined action when one of the latencies run beyond a preset point within the time slice switch duration.

17. The method of claim 16, wherein the predetermined action is one of halting the processor, resetting the processor, or ignoring the latency to allow the schedule to continue.

18. A non-transitory computer readable storage medium including a set of instructions executable by a processor, the set of instructions, when executed by the processor, operable to cause the processor to perform operations comprising:
determining a time slice for each of a plurality of processes;
determining a duration of each of a plurality of time slice switches between consecutive ones of the time slices;
determining a starting point for each time slice;
generating a schedule including the time slices as a function of durations of each of the time slices, the durations of each of the time slice switches, and the starting points of the time slices, the schedule including an order for each of the time slices for a respective one of the plurality of processes,
wherein, when performance of one of the time slice switches requires less time than the duration of the one of the time slice switches, a scheduler waits until the end of the duration before completing a context switch in order to guarantee a periodicity of the schedule; and
wherein the duration of each of the time slice switches is determined in response to generating a worst case time latency and a time context switch worst case for one of the plurality of processes being executed during the respective time slice.

\* \* \* \* \*